US012659509B2

(12) United States Patent
Choe et al.

(10) Patent No.: US 12,659,509 B2
(45) Date of Patent: *Jun. 16, 2026

(54) METHOD, APPARATUS, AND SYSTEM FOR ENCODING AND DECODING IMAGE USING LM CHROMA PREDICTION

(71) Applicant: IDEAHUB INC., Seoul (KR)

(72) Inventors: Yoonsik Choe, Goyang-si (KR); Jang Won Choi, Incheon (KR)

(73) Assignee: IDEAHUB INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,731

(22) Filed: Oct. 10, 2024

(65) Prior Publication Data

US 2025/0039442 A1      Jan. 30, 2025

Related U.S. Application Data

(63) Continuation of application No. 17/865,551, filed on Jul. 15, 2022, now Pat. No. 12,149,736, which is a
(Continued)

(51) Int. Cl.
H04N 19/593 (2014.01)
H04N 19/11 (2014.01)
(Continued)

(52) U.S. Cl.
CPC ......... H04N 19/593 (2014.11); H04N 19/117 (2014.11); H04N 19/176 (2014.11);
(Continued)

(58) Field of Classification Search
None
See application file for complete search history.

(56) References Cited

U.S. PATENT DOCUMENTS 5,086,412 A     2/1992  Jaffe et al.
6,278,630 B1    8/2001  Yamada
(Continued)

FOREIGN PATENT DOCUMENTS

JP        09116107 A     5/1997
JP        2002197857 A   7/2002
(Continued)

OTHER PUBLICATIONS

Chen et al., "CE6.a.4: Chroma intra prediction by reconstructed luma samples", JCTVC-E266, 5th Meeting, Geneva, Switzerland, Mar. 2011.
(Continued)

*Primary Examiner* — Edemio Navas, Jr.
(74) *Attorney, Agent, or Firm* — WILLIAM PARK AND ASSOCIATES LTD.

(57)          ABSTRACT

Disclosed are methods, apparatuses, and systems for encoding and decoding an image. The present invention provides an intra prediction unit that receives an input image, calculates a correlation between a Luma area block and Chroma area block in the input image in intra prediction, removes high frequency ingredients by low-pass filtering an encoded luma pixel based on the calculated correlation, and generates a prediction block by applying an LM chroma mode, which is an extended chroma mode technique, to the luma pixel removed therefrom the high frequency ingredients.

7 Claims, 9 Drawing Sheets
(1 of 9 Drawing Sheet(s) Filed in Color)

Related U.S. Application Data continuation of application No. 16/990,532, filed on Aug. 11, 2020, now Pat. No. 11,425,419, which is a continuation of application No. 16/193,406, filed on Nov. 16, 2018, now Pat. No. 10,798,413, which is a continuation of application No. 15/101,780, filed as application No. PCT/KR2014/009222 on Sep. 30, 2014, now Pat. No. 10,158,882.

(51) Int. Cl.

| | |
|---|---|
| *H04N 19/117* | (2014.01) |
| *H04N 19/176* | (2014.01) |
| *H04N 19/182* | (2014.01) |
| *H04N 19/184* | (2014.01) |
| *H04N 19/186* | (2014.01) |
| *H04N 19/82* | (2014.01) |

(52) U.S. Cl.
CPC ......... *H04N 19/182* (2014.11); *H04N 19/184* (2014.11); *H04N 19/186* (2014.11); *H04N 19/82* (2014.11); *H04N 19/11* (2014.11)

(56) References Cited

U.S. PATENT DOCUMENTS

| | | | |
|---|---|---|---|
| 6,317,356 | B1 | 11/2001 | Hoffmann et al. |
| 6,459,609 | B1 | 10/2002 | Du |
| 7,227,585 | B1 | 6/2007 | Murdock et al. |
| 9,307,237 | B2 | 4/2016 | Liu et al. |
| 9,351,001 | B2 | 5/2016 | Yang et al. |
| 9,948,938 | B2 | 4/2018 | Gupte et al. |
| 10,158,882 | B2 | 12/2018 | Choe et al. |
| 2007/0115384 | A1 | 5/2007 | Furukawa |
| 2008/0284792 | A1 | 11/2008 | Bell et al. |
| 2009/0297054 | A1 | 12/2009 | Regunathan et al. |
| 2010/0208993 | A1 | 8/2010 | Sambongi |
| 2012/0328013 | A1 | 12/2012 | Budagavi et al. |
| 2013/0182761 | A1 | 7/2013 | Chen et al. |
| 2013/0336591 | A1 | 12/2013 | Jeon et al. |
| 2014/0078394 | A1 | 3/2014 | Lou et al. |
| 2014/0140401 | A1 | 5/2014 | Lee et al. |
| 2014/0314142 | A1 | 10/2014 | Oh et al. |
| 2015/0003524 | A1 | 1/2015 | Yamamoto et al. |
| 2015/0063460 | A1 | 3/2015 | Gamei et al. |
| 2015/0078447 | A1 | 3/2015 | Gamei et al. |
| 2015/0341636 | A1 | 11/2015 | Tsai et al. |
| 2016/0198190 | A1* | 7/2016 | Budagavi ............... H04N 19/44 375/240.12 |
| 2016/0241861 | A1 | 8/2016 | Choe et al. |

FOREIGN PATENT DOCUMENTS

| | | | |
|---|---|---|---|
| JP | 2009538086 | A | 10/2009 |
| JP | 4989048 | B2 | 8/2012 |
| KR | 1019980074795 | A | 11/1998 |
| KR | 1020070072327 | A | 7/2007 |
| KR | 1020120003147 | A | 1/2012 |
| KR | 1020130044263 | B1 | 5/2013 |
| KR | 1020130004214 | A | 8/2016 |
| KR | 1020130078320 | A | 8/2016 |
| KR | 1020120041287 | A | 10/2016 |

OTHER PUBLICATIONS

Gunturk, Bahadir et al. "Color Plane Interpolation Using Alternating Projections", IEEE Transactions on Image Processing, vol. 11, No. 9, pp. 997-1013, Sep. 2002.

Han, "Development if HEVC Based Coding Tools for Efficient Screen Content Coding", Hanbat National University Doctoral Thesis, Feb. 2013.

Kawashima, Shoichiro et al., "A Bit-Line GND Sense Technique for Low-Voltage Operation FeRAM"—2001 Symposium of VLSI Circuit Digest of Technical Papers, Kyoto, Japan Jun. 14-16, 2001, Published IEEE Aug. 7, 2002.

Kim, "RCE1: The performance of extnded chroma mode for non 4:2:0 format", JCTVC-M0097, 13th JTC-VC Meeting, Incheon, Korea, Apr. 2013.

Sakimura, Noboru et al. A 512Kb Cross-Point Cell Mram, ISSCC 2003/Session 16/Non-Volatile Memory/ Paper 16.1, Sagamihara, Japan—IEEE Internation Solid-State Circuits Conference, Feb. 2003.

* cited by examiner (a)

LMCM

Luma(G) → CORRELATION CALCULATING UNIT (COC) → LOW PASS FILTER (LPF) → CORRELATION CALCULATING UNIT (ECM) → Chroma(B,R)

FIG. 5

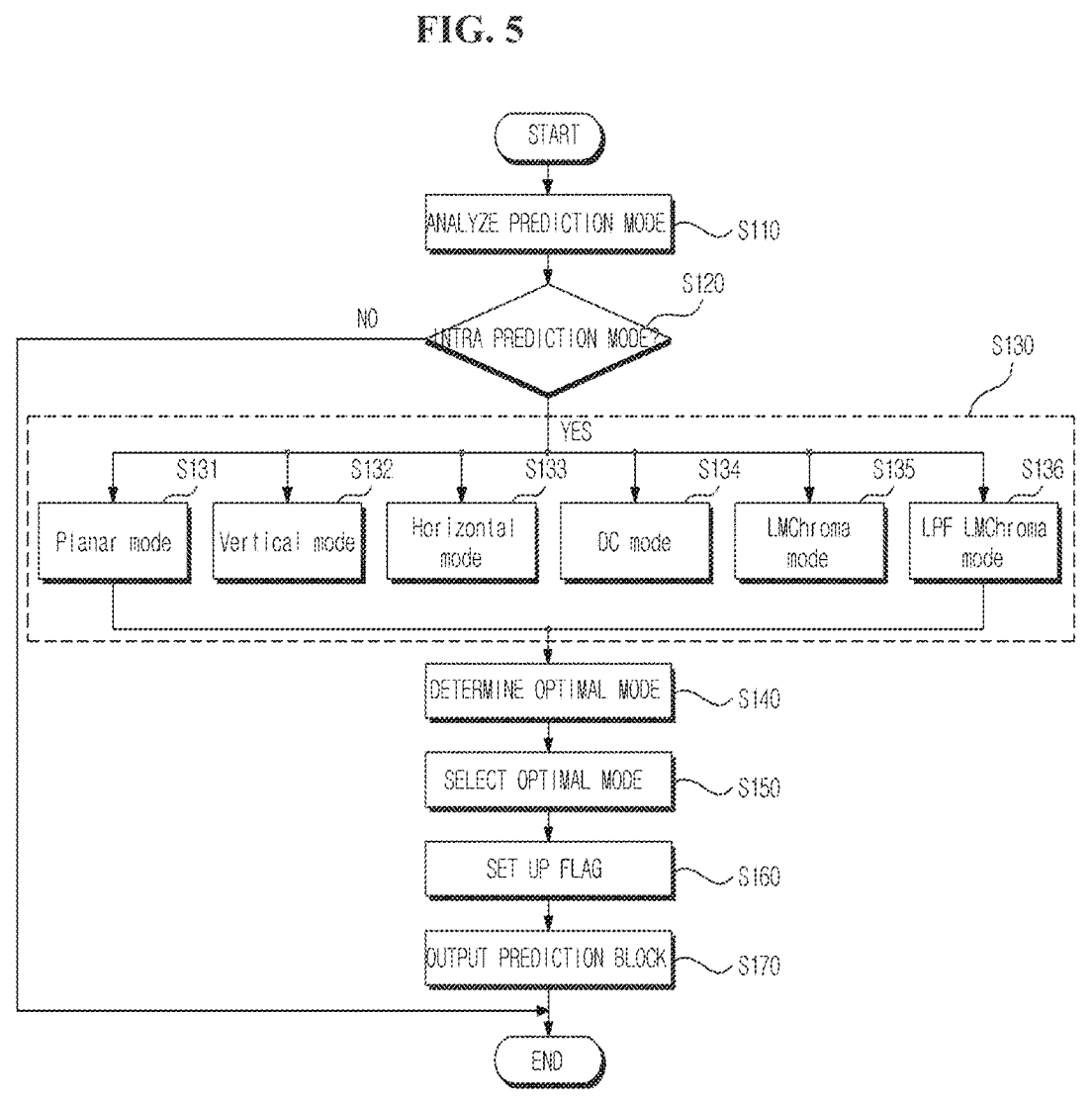

START

ANALYZE PREDICTION MODE — S110

INTRA PREDICTION MODE? — S120

NO

YES

S130

Planar mode — S131

Vertical mode — S132

Horizontal mode — S133

DC mode — S134

LMChroma mode — S135

LPF LMChroma mode — S136

DETERMINE OPTIMAL MODE — S140

SELECT OPTIMAL MODE — S150

SET UP FLAG — S160

OUTPUT PREDICTION BLOCK — S170

END

METHOD, APPARATUS, AND SYSTEM FOR ENCODING AND DECODING IMAGE USING LM CHROMA PREDICTION

CROSS-REFERENCE TO RELATED APPLICATIONS

The present application is a continuation of U.S. patent application Ser. No. 17/865,551, filed Jul. 15, 2022, which is a continuation of U.S. patent application Ser. No. 16/990, 532, filed Aug. 11, 2020, which is a continuation of U.S. patent application Ser. No. 16/193,406, filed Nov. 16, 2018, which is a continuation of U.S. patent application Ser. No. 15/101,780, filed Jun. 3, 2016, now U.S. Pat. No. 10,158, 882, issued Dec. 18, 2018; which is the U.S. national stage application of International Patent Application No. PCT/KR2014/009222, filed Sep. 30, 2014; which claims priority under 35 U.S.C. § 119 (a) to Korean Patent Application No. 10-2013-0149075, filed Dec. 3, 2013, in the Korean Intellectual Property Office, the entire contents of which applications are incorporated herein by reference.

TECHNICAL FIELD

The present disclosure relates to methods of encoding and decoding image, apparatus and system therefor, and more particularly, to methods, apparatus, and a system for encoding and decoding an image for improving efficiencies of predictions between color planes of a RGB image in high efficiency video coding (HEVC).

BACKGROUND ART

Following the standardized high efficiency video coding (HEVC), a HEVC range extension is currently being standardized for developing an extended technique for supporting 4:2:2 and 4:4:4 color samplings and YUV images and RGB images corresponding to 10 bit, 12 bit, and 14 bit depths. Here, unlike an YUV image, a RGB image exhibits high correlations between respective color planes R, G, and B. Based on the same, an extended chroma mode (referred to hereinafter as 'ECM') has been suggested by J. Kim at a recent MPEG standardization conference (J. Kim, "RCE1: The performance of extended chroma mode for non 4:2:0 format", JCTVC-M0097, 13th JCT-VC Meeting, Incheon, Korea, April 2013)

The ECM suggested by J. Kim is a technique for predicting pixel values in a chroma (or B, R) area with reference to an encoded luma (or G) pixel in case of an intra prediction for chroma (U, V; B, R in the RGB coding) pixel. The algorithm employs a technique suggested by J. Chen during the standardization of the HEVC, but is not employed by the HEVC (J. Chen, V. Seregin, W-J Han, J. Kim, B. Jeon, "CE6.a.4: chroma intra prediction by reconstructed luma samples", JCTVC-E266, 5th Meeting, Geneva, Switzerland, March 2011). However, unlike the YUV 4:2:0 format of the HEVC, the RGB 4:4:4 format exhibits high correlations between color planes. Therefore, if the technique suggested by J. Chen is modified in correspondence to the RGB 4:4:4 format instead of the YUV format and applied to the RGB 4:4:4 format, compression efficiency may be significantly improved. In other words, a high coding gain may be obtained. Therefore, the technique may be applied to the HEVC range extension.

However, as a result of analysis of a large number of RGB images, a common RGB image exhibits low correlations between color planes at high frequency areas of the color planes. In other words, due to low correlations between color planes at high frequency areas, high frequency ingredients for luma area may interfere chroma pixel prediction during an application of the ECM, thereby deteriorating compression efficiency.

TABLE 1

| Test sequence | G/B | | | | G/R | | | |
| --- | --- | --- | --- | --- | --- | --- | --- | --- |
| | LL | LH | HL | HH | LL | LH | HL | HH |
| Traffic | 0.926 | 0.634 | 0.614 | 0.549 | 0.963 | 0.837 | 0.810 | 0.777 |
| Kimono1 | 0.948 | −0.105 | 0.136 | −0.008 | 0.977 | −0.011 | 0.303 | 0.045 |
| EBULupoCandlelight | 0.820 | 0.859 | 0.869 | 0.899 | 0.904 | 0.944 | 0.929 | 0.940 |
| EBURainFruits | 0.909 | 0.972 | 0.970 | 0.955 | 0.892 | 0.971 | 0.969 | 0.956 |
| VenueVu | 0.720 | 0.885 | 0.853 | 0.553 | 0.597 | 0.840 | 0.604 | 0.229 |
| DucksAndLegs | 0.906 | 0.227 | −0.090 | −0.154 | 0.963 | 0.238 | 0.125 | −0.186 |
| OldTownCross | 0.981 | 0.456 | 0.265 | 0.025 | 0.984 | 0.617 | 0.466 | 0.243 |
| ParkScene | 0.919 | 0.247 | 0.443 | 0.117 | 0.972 | 0.406 | 0.462 | 0.126 |
| Overall | 0.891 | 0.522 | 0.508 | 0.367 | 0.907 | 0.605 | 0.584 | 0.391 |

Table 1 shows results of calculating correlations between four frequency bands between color planes (G-B and G-R) by using first frames of 8 RGB experimental images currently used in the HEVC range extension and shows correlations between color planes corresponding to respective frequency bands in HEVC range extension RGB experimental images. Table 1 is published in "Color plane interpolation using alternating projections," (B. K. Gunturk, Y. Altunbasak, and R. M. Mersereau), IEEE Trans. Video Processing, Vol. 11, No. 9, pp. 997-1013 September 2002. The technique disclosed therein can analyze frequencies of a RGB image based on mathematical analysis of correlations between color planes R, G, and B, where each correlation has a range from −1 to 1. The higher the correlation indicates the corresponding color planes having the higher correlation to each other.

In Table 1, the LL frequency band indicates low frequency ingredients of an image, the LH and HL frequency bands indicate horizontal and vertical edge ingredients of the image, and the HH frequency band indicates diagonal edge ingredients of the image, that is, high frequency ingredients. Except an EBULupoCandlelight image and an EBURain-Fruits image, images generally exhibit high correlations in low frequency areas LL and low correlations in high frequency areas HH. Referring to Table 1, RGB images exhibit high correlations (0.90 average) in LL frequency bands and low correlations (0.38 average) in HH frequency bands. As shown in Table 1, high frequency ingredients having low correlations compared to the other frequency ingredients having generally high correlations may deteriorate compression efficiency when pixel values between color planes are predicted by using the ECM.

DETAILED DESCRIPTION OF THE INVENTION

Technical Problem

The present invention provides methods of encoding and decoding an image for improving efficiency of predicting pixel values between color planes by filtering high frequency ingredients exhibiting low correlations between the color planes.

The present invention also provides apparatuses for encoding and decoding an image for accomplishing the technical goal.

The present invention also provides a system for encoding and decoding an image for accomplishing the technical goal.

Technical Solution

According to an aspect of the present invention, there is provided an image encoding apparatus including an intra prediction unit that receives an input image, calculates a correlation between a Luma area and Chroma areas during intra prediction, removes high frequency ingredients by low-pass filtering an encoded luma pixel based on the calculated correlation, and generates a prediction block by predicting the chroma pixel by applying an LM chroma mode, which is an extended chroma mode technique to the luma pixel removed therefrom the high frequency ingredients.

The intra prediction unit includes a chroma predicting unit, which includes a plurality of pre-set mode prediction units including a LM chroma mode prediction unit that generates the prediction block by applying the LM chroma mode to the encoded luma pixel, wherein the mode prediction unit individually perform intra prediction to generate a plurality of prediction blocks; a rate-distortion optimizing unit, which receives the plurality of prediction blocks and determines an optimal prediction block from among the plurality of prediction blocks according to pre-set rules; and a mode selecting unit, which sets up a flag corresponding to a mode for generating the optimal prediction block from among the plurality of modes and outputs the flag together with the optimal prediction block.

The LM chroma mode prediction unit includes a correlation calculating unit, which calculates a correlation between the Luma area block and the Chroma area block and determines whether the calculated correlation is smaller than a pre-set threshold value; a low pass filter, which, if the calculated correlation is smaller than the pre-set threshold value, low-pass filters the luma pixel; and an extended chroma prediction unit, which, if the calculated correlation is equal to or greater than the pre-set threshold value, generates the prediction block by applying the LM chroma mode to the luma pixel applied by the correlation calculating unit and, if the calculated correlation is smaller than the pre-set threshold value, generates the prediction block by applying the LM chroma mode to the luma pixel low-pass filtered by the low pass filter.

According to another aspect of the present invention, there is provided an image decoding apparatus including an intra prediction unit that receives a bitstream, analyzes a flag included in the bitstream during an intra prediction, removes high frequency ingredients by selectively low pass filtering a luma pixel based on a set value of a correlation flag included in the analyzed flag, and generates a prediction block regarding Chroma areas by applying an LM chroma mode, which is an extended chroma mode technique to the luma pixel removed therefrom the high frequency ingredients.

The intra prediction unit includes a flag analyzing unit, which analyzes a flag set to the bitstream; a mode selecting unit, which selects a mode for performing intra prediction from among a plurality of pre-set modes including the LM chroma mode based on the analyzed flag; and a chroma predicting unit, which includes a plurality of pre-set mode prediction units including a LM chroma mode prediction unit that generates the prediction block by applying the LM chroma mode to the luma pixel, wherein the mode prediction unit individually perform intra prediction to generate a plurality of prediction blocks.

The LM chroma mode prediction unit includes a correlation flag determining unit, which determines whether a correlation flag is set to the flag analyzed by the flag analyzing unit; a low pass filter, which, if the correlation flag is set, low-pass filters the luma pixel; and an extended chroma prediction unit, which, if no correlation flag is set, generates the prediction block by applying the LM chroma mode with regard to the luma pixel applied by the correlation calculating unit and, if the correlation flag is set, generates the prediction block by applying the LM chroma mode to the luma pixel low-pass filtered by the low pass filter.

If the correlation flag is set, the chroma predicting unit low-pass filters the luma pixel by using the low pass filter, calculates the low-pass filtered the luma pixel according to Equation $$G^{lpf}_{recon}[x, y] = 0.5\, G_{recon}[x, y] + 0.125\ G_{recon}[x+1, y] + 0.125\ G_{recon}[x-1,$$
$$y] + 0.125\ G_{recon}[x, y+1] + 0.125\ G_{recon}[x, y-1],$$

applies the LM chroma mode to the low-pass filtered luma pixel, and generates the prediction block according to an Equation $$C_{pred}[x, y] = \alpha G^{lpf}_{recon}[x, y] + \beta\ (\text{here, } G^{lpf}_{recon}$$

denotes a low pass filtered luma pixel, and $\alpha$ and $\beta$ are weights inferred by using the luma pixel at same locations as pixel values around the Chroma blocks).

According to another aspect of the present invention, there is provided an image encoding method employed by an image encoding apparatus that receives an input image, encodes the input image based on intra prediction, and outputs a bitstream, the method including calculating a correlation between a Luma area block and a Chroma area block in the input image during intra prediction; if the correlation is smaller than a pre-set threshold value, removing, by the image encoding apparatus, high frequency ingredients by low-pass filtering the encoded luma pixel; if the correlation is smaller than the pre-set threshold value, generating a prediction block by applying an LM chroma mode, which is an extended chroma mode technique, with regard to the low-pass filtered luma pixel or, if the correlation is equal to or greater than the pre-set threshold value, generating a prediction block by applying the LM chroma mode to the luma pixel that are not low-pass filtered; and, generating a bitstream of a RGB image exhibiting high correlations between color planes by using the prediction block and outputting the bitstream.

According to another aspect of the present invention, there is provided an image decoding method employed by an image encoding apparatus that receives a bitstream, encodes the bitstream based on intra prediction, and outputs a restored image, the method including receiving, by the image decoding apparatus, the bitstream and obtaining a Luma area block; obtaining and analyzing a flag included in the bitstream and selecting a mode for performing intra prediction from among a plurality of pre-set modes; if a mode selected based on the analyzed flag is a LM chroma mode, analyzing the setting of a correlation flag included in the flag; if the correlation flag is set, removing high frequency ingredients of the luma pixel by low-pass filtering the luma pixel; if the correlation flag is set, generating a prediction block by applying the LM chroma mode, which is an extended chroma mode technique, with regard to the low-pass filtered luma pixel and, if no correlation flag is set, generating a prediction block by applying the LM chroma mode to the luma pixel that are not low-pass filtered; and outputting the resconstructed image by using the prediction block.

According to another aspect of the present invention, there is provided an imaging system including an image encoding apparatus that receives an input image, calculates a correlation between a Luma area block and a Chroma area block in the input image during intra prediction, removes high frequency ingredients by low-pass filtering the encoded luma pixel based on the calculated correlation, generates a prediction block by applying an LM chroma mode, which is an extended chroma mode technique, with regard to the low-pass filtered the luma pixel removed therefrom the high frequency ingredients, and generates and outputs a bitstream of a RGB image exhibiting high correlations between color planes by using the prediction block; and an image decoding apparatus that receives the bitstream and obtaining a Luma area block, analyzes a flag included in the bitstream, removes high frequency ingredients of the luma pixel by selectively low-pass filtering the luma pixel based on the setting of a correlation flag of the analyzed flag, generates a prediction block by applying the LM chroma mode, which is an extended chroma mode technique, to the luma pixel removed therefrom the high frequency ingredients, and outputs the reconstructed image by using the prediction block.

Advantageous Effects

Therefore, according to methods, apparatuses, and a system for encoding and decoding an image according to the present invention, during intra prediction, a correlation between color planes is calculated in an extended chroma mode, low-pass filtering is selectively applied with regard to a Luma area block, and a prediction block is generated by performing a LM chroma mode. Therefore, encoding or decoding may be performed in the LM chroma mode after low-pass filtering is selectively performed based on a correlation, and thus coding efficiency may be improved.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is a schematic block diagram showing an image encoding apparatus according to the present invention;

FIG. 3 is a diagram showing an example of the intra prediction unit of FIG. 2;

FIG. 4 shows a detailed configuration of the LM chroma mode prediction unit of FIG. 3;

FIG. 5 is a diagram showing an example of in-screen prediction methods for an encoding operation performed by the intra predicting unit of FIG. 3;

FIG. 6 is a schematic block diagram showing an example structure of an image decoding apparatus according to an embodiment of the present invention;

MODE OF THE INVENTION

Figure 1:
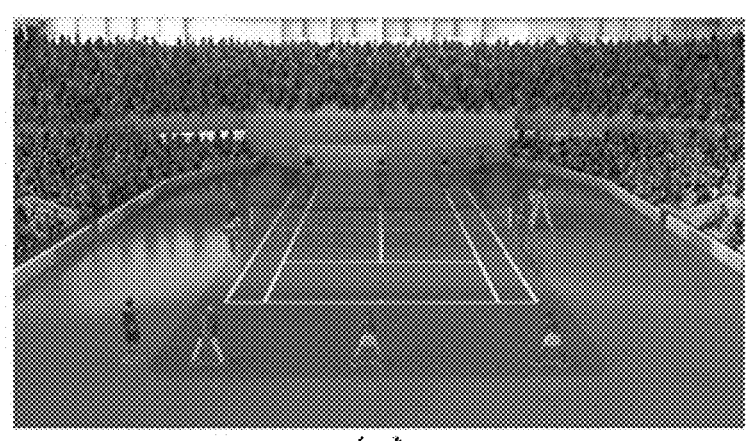
FIG. 1 is a diagram showing in-screen correlations between high frequency areas of color planes in an image.
Figure 1:
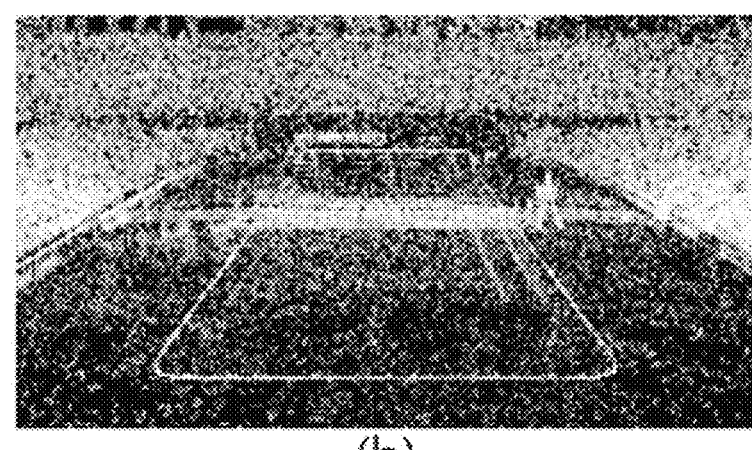
Figure 1:
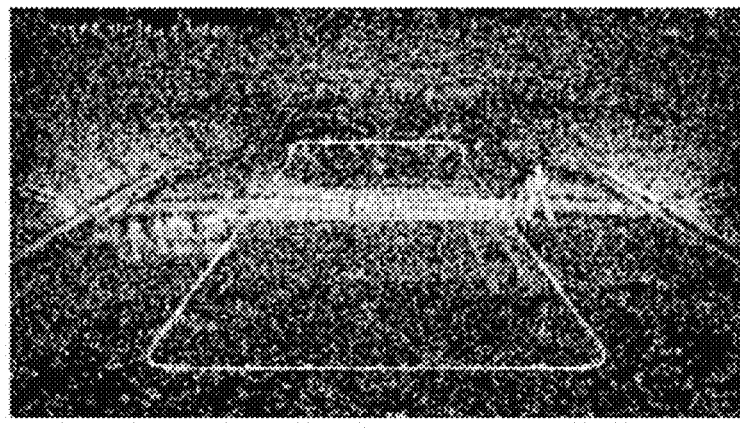

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

Throughout the specification, when a portion "includes" an element, another element may be further included, rather than excluding the existence of the other element, unless otherwise described. As used herein, the terms "unit", "element", "module", etc. should be understood as units in which at least one function or operation is performed and which may be embodied in the form of hardware, software, or a combination of hardware and software.

As described above, an extended chroma mode (ECM) is a technique for predicting pixel values in a chroma area with reference to an encoded luma area during an intra prediction for chroma pixel. By using the technique, a very high coding gain may be obtained with respect to a RGB image exhibiting high correlations between color planes. The ECM is included to an intra prediction mode for chroma pixel and is configured to be selected via a competition with conventional intra prediction modes for chroma pixel.

Since a RGB image is encoded in the order of G, B, and R, a color plane B and a color plane R may be encoded in the intra prediction mode for chroma pixel. Equation 1 below is a mathematical expression of the ECM technique regarding a RGB image.

$$C_{pred}[x, y] = \alpha \, G_{recon}[x, y] + \beta \qquad \text{[Equation 1]}$$

Here, $C_{pred}$ denotes a pixel value of a B block or a R block to be predicted, $G_{recon}$ denotes a decoded pixel value of an encoding-completed G block, and [x, y] denote locations of pixels. $\alpha$ and $\beta$ are weights and are inferred by using pixel values of the G block at same locations as pixel values around the B block or the R block.

As shown in Equation 1, the ECM is a technique for predicting chroma pixel values by using pixel values of an encoded luma pixel. However, the ECM technique may be useful only when correlations between color planes are high.

FIG. 1 is a diagram showing intra correlations between high frequency areas of color planes in an image.

FIG. 1 shows intra correlations between the high frequency areas HH of color planes G-B and color planes G-R in the first frame of a Venue Vu image from among the eight images shown in Table 1. FIG. 1A shows an original image, FIG. 1B shows intra correlations between the high frequency areas of the color planes G-B, and FIG. 1C shows intra correlation between the high frequency areas of the color planes G-R. In FIGS. 1B and IC, the correlations between the color planes G-B and the correlations between the color planes G-R are calculated by splitting screen images to 8×8 blocks. Darker areas indicate lower correlations, whereas brighter areas indicate higher correlations.

Referring to FIGS. 1B and IC, an image includes both areas corresponding to high correlations between high frequency areas of color planes and areas corresponding to low correlations between the high frequency areas of the color planes.

Therefore, according to the present invention, when pixel values are predicted by using the ECM to improve accuracy of a prediction between color planes, efficiency of the prediction between the color planes may be improved by removing high frequency ingredients of a luma (G) area having a low correlation in advance. Furthermore, to handle changes of correlations of an intra high frequency area, the present invention suggests a prediction unit (PU) adaptive filtering technique.

Figure 2:
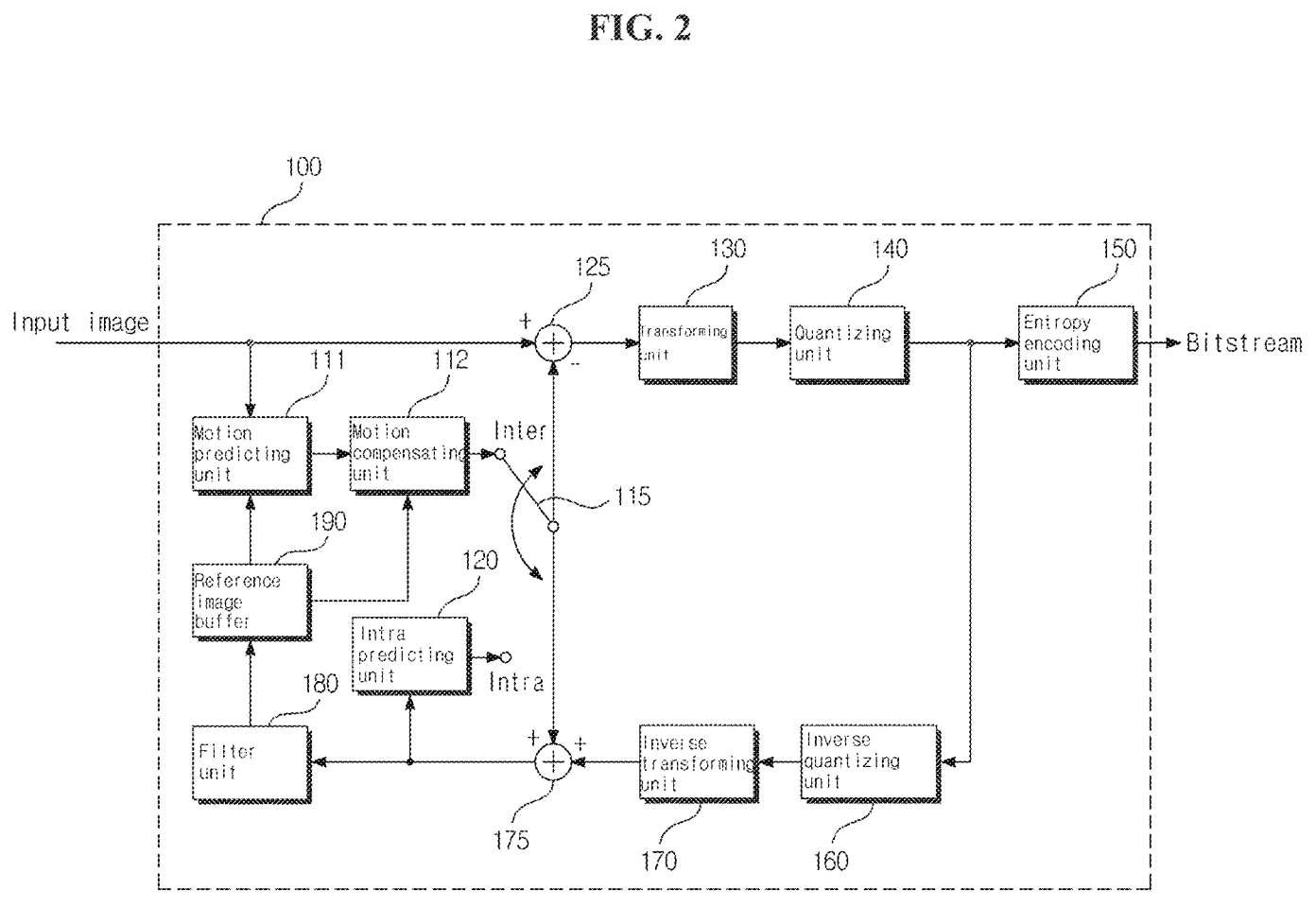

FIG. 2 is a schematic block diagram showing an image encoding apparatus 100 according to the present invention.

Referring to FIG. 2, the image encoding apparatus 100 includes a motion predicting unit 111, a motion compensating unit 112, an intra predicting unit 120, a switch 115, a subtractor 125, a transforming unit 130, a quantizing unit 140, an entropy encoding unit 150, an inverse quantizing unit 160, an inverse transforming unit 170, an adder 175, a filter unit 180, and a reference image buffer 190.

The image encoding apparatus 100 encodes an input image in an intra mode or an inter mode and outputs a bitstream. In the below embodiments of the present invention, an intra prediction may be used as a synonym of an in-screen prediction, whereas an inter prediction may be used as a synonym of an inter-screen prediction. To determine the optimal prediction method regarding a prediction unit, an intra prediction mode and an inter prediction mode may be selectively applied with respect to the prediction unit. The image encoding apparatus 100 may generate a prediction block regarding an original block of an input image and encodes a difference between the original block and the prediction block.

In an intra prediction mode, the intra predicting unit 120 (an intra prediction unit may be used as a synonym) supports a chroma mode for predicting chroma pixel values (B, R) with reference to pixel values of an encoded Luma (G) pixel during intra predictions of chroma (B, R) screen images. In particular, the intra predicting unit 120 according to the present invention provides not only chroma modes provided by a conventional intra prediction unit, which include a planar mode, a vertical mode, a horizontal mode, and a DC mode, but also an LMchroma mode, which is an ECM mode suggested by J. Kim. However, the intra predicting unit 120 according to the present invention may calculate a correlation between chroma (B, R) pixels adjacent to a Luma (G) pixel when a prediction block is generated, and remove high frequency region of Luma (G) pixel by using low pass filter (LPF) based on the calculated correlation, and then apply LMchroma mode to the Luma (G) pixel. In other words, the intra predicting unit 120 may perform low pass filtering to Luma (G) pixel based on a correlation between the Chroma areas (B, R) and the Luma (G) area, which are adjacent to each other, before applying the LMChroma mode to Luma (G) pixel.

Furthermore, the intra predicting unit 120 generates prediction blocks in all available modes, selects the most efficient mode among the all available modes, and outputs a prediction block generated in the selected mode. Detailed descriptions of the intra predicting unit 120 will be given below.

In an inter prediction mode, the motion predicting unit 111 searches for an area of a reference image stored in the reference image buffer 190, which is the best-matched to an input block, and calculates a motion vector during a motion prediction. The motion compensating unit 112 generates a prediction block by performing motion compensation by using the motion vector.

The subtractor 125 generates a residual block based on a difference between the input block and the generated prediction block. The transforming unit 130 performs transformation with respect to the residual block and outputs a transformation coefficient. Furthermore, the quantizing unit 140 quantizes the input transformation coefficient according to quantization parameters and outputs a quantized coefficient. The entropy encoding unit 150 entropy-encodes the input quantized coefficient based on probability distribution and outputs a bitstream.

Since inter prediction encoding, that is, inter-screen prediction encoding is performed in the HEVC, it is necessary to decode and store a currently encoded image to be used as a reference image. Therefore, a quantized coefficient is inverse quantized by the inverse quantizing unit 160 and is inverse transformed by the inverse transforming unit 170. The inverse-quantized and inverse-transformed coefficient is added to a prediction block by the adder 175, and thus a restored block is generated.

The reconstructed block is filtered by the filter unit 180, where the filter unit 180 may apply at least one of a deblocking filter, a sample adaptive offset (SAO), and an adaptive loop filter (ALF) to the reconstructed block or a reconstructed picture. The filter unit 180 may also be referred to as an adaptive in-loop filter. The deblocking filter may remove block distortions formed at boundaries between blocks. The SAO may add a suitable offset value to a pixel value for compensating a coding error. The ALF may be performed based on values obtained by comparing a reconstructed image to an original image and may be performed only when high efficiency is required. The reconstructed block filtered by the filter unit 180 is stored in the reference image buffer 190.

Figure 3:
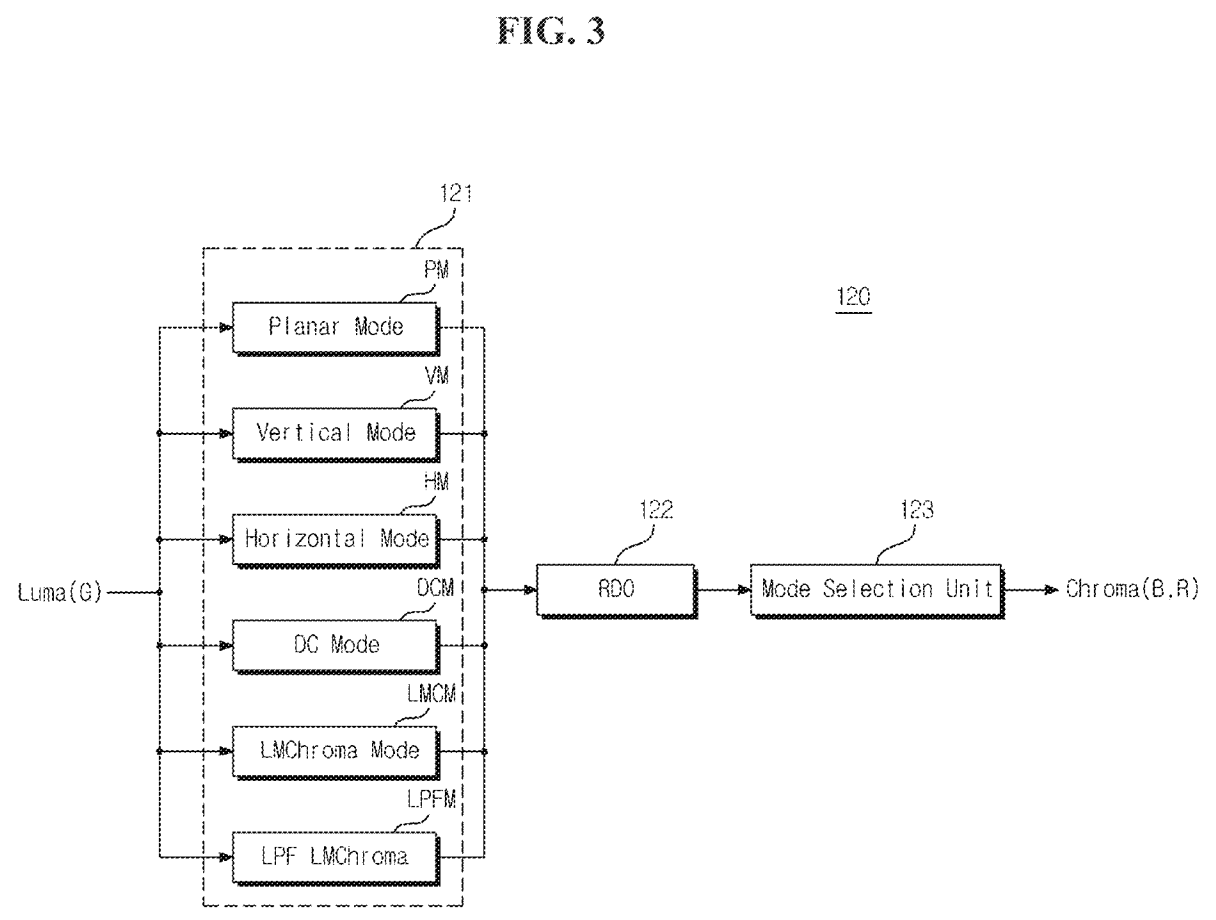

FIG. 3 is a diagram showing an example of the intra prediction unit of FIG. 2.

In the HEVC, in addition to encoding of macro block in the related art, three new units, which are a coding unit (CU), a prediction unit (PU), and a transformation unit (TU), are additionally defined. From among the new units, when a block-by-block splitting operation is performed and coding units are determined, the prediction unit is determined with respect to all coding units that are no longer split. According to the present invention, when the intra predicting unit 120 predicts a chroma pixel value (B, R) via prediction between color planes during prediction of pixel values by using prediction units, high frequency ingredients of a luma (G) pixel that is arranged at a same location as chroma (B, R) pixels to be encoded are removed by using a low pass filter (LPF). Therefore, the present invention may provide a filtering technique adaptive to changes of correlations of a luma (G) pixel from which high frequency regions are removed.

Although the intra predicting unit 120 of FIG. 3 may support modes other than the chroma mode, only the configuration regarding the chroma mode for predicting chroma (B, R) pixel values with reference to encoded luma (G) pixel values is shown for convenience of explanation.

In FIG. 3, the intra predicting unit 120 includes a chroma predicting unit 121, a rate-distortion optimizing unit 122, and a mode selecting unit 123.

Like a conventional intra prediction unit, the chroma predicting unit 121 includes a planar mode prediction unit PM, a vertical mode prediction unit VM, a horizontal mode prediction unit HM, and a DC mode prediction unit DC mode. The planar mode prediction unit PM, the vertical mode prediction unit VM, the horizontal mode prediction unit HM, and the DC mode prediction unit DC mode perform intra predictions by using intra prediction modes known in the art, that is, a planar mode, a vertical mode, a horizontal mode, and a DC mode. Since those predictions are known in the art, detailed descriptions thereof will be omitted.

Furthermore, the chroma predicting unit 121 according to the present invention further includes a LMchroma mode prediction unit LMCM for the ECM.

When the chroma predicting unit 121 performs chroma predictions in all modes set up by using the planar mode prediction unit PM, the vertical mode prediction unit VM, the horizontal mode prediction unit HM, the DC mode prediction unit DC mode, and the LMchroma mode prediction unit LMCM, the rate-distortion optimizing unit 122 receives pixel values of prediction blocks chroma-predicted in a plurality of modes and determines an optimal mode.

The mode selecting unit 123 receives mode information regarding the optimal mode determined by the rate-distortion optimizing unit 122, sets up a flag corresponding to the optimal mode, and transmits the set up flag with predicted pixel values regarding a corresponding block.

Figure 4:
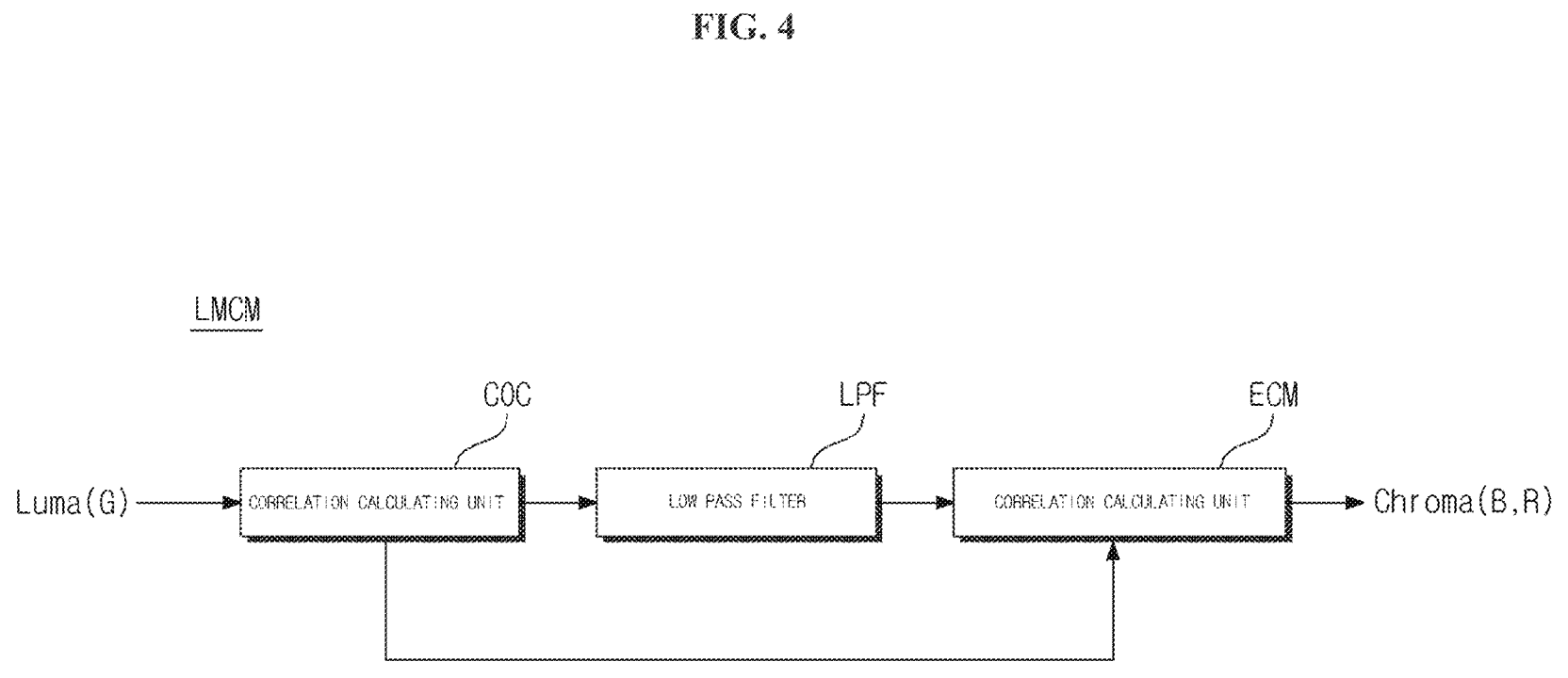

FIG. 4 shows a detailed configuration of the LMchroma mode prediction unit LMCM of FIG. 3.

In FIG. 4, the LMchroma mode prediction unit LMCM includes a correlation calculating unit COC, a low pass filter LPF, and an extended chroma prediction unit ECM. The correlation calculating unit COC receives an encoded block including Luma (G) pixel and calculates a correlation between the Luma (G) pixel and the Chroma (B, R) pixel corresponding to the Luma (G) pixel. Next, it is determined whether the calculated correlation is smaller than a pre-set threshold value. If the calculated correlation is equal to or greater than the pre-set threshold value, the correlation calculating unit COC directly transmits the block including Luma (G) pixel to the extended chroma prediction unit ECM. If the calculated correlation is smaller than the pre-set threshold value, the correlation calculating unit COC transmits the block including Luma (G) pixel to the low pass filter LPF.

The low pass filter LPF receives the block including Luma (G) pixel, removes high frequency region of the Luma (G) pixel, and transmits the low-pass filtered Luma (G) pixel values to the extended chroma prediction unit ECM.

The extended chroma prediction unit ECM predicts Chroma (B, R) pixel values by applying the Luma (G) pixel values transmitted from the correlation calculating unit COC or the low pass filter LPF to Equation 1.

Therefore, the LMchroma mode prediction unit LMCM off FIG. 4 may operate in the same regard as a LMchroma mode in the related art. However, if a correlation between the Luma (G) area and the Chroma (B, R) areas is smaller than a threshold value, high frequency ingredients is removed from the Luma (G) pixel by applying the low pass filter LPF and the Chroma (B, R) pixel values are predicted by performing an LMchroma mode. In the present invention, a technique for removing high frequency ingredients from the Luma (G) area block by applying the low pass filter LPF and predicting the Chroma (B, R) pixel values by performing an LMchroma mode is referred to as a LPF LMchroma mode.

Equation 2 is a mathematical expression of a block prediction technique performed by the LPF LMchroma mode LPFM.

$$C_{pred}[x, y] = \alpha \ G_{recon}^{lpf}[x, y] + \beta \qquad \text{[Equation 2]}$$

(here, $$G_{recon}^{lpf}$$

denotes a pixel value of a low pass filtered G block, and, like in Equation 1, $\alpha$ and $\beta$ are weights and are inferred by using pixel values of the G block at same locations as pixel values around the B block or the R block.)

$$G_{recon}^{lpf}[x, y] = 0.5 \ G_{recon}[x, y] + 0.125 \ G_{recon}[x + 1, y] + \qquad \text{[Equation 3]}$$
$$0.125 \ G_{recon}[x - 1, y] + 0.125 \ G_{recon}[x, y + 1] +$$
$$0.125 \ G_{recon}[x, y - 1]$$

Equation 3 is an example of calculating a pixel value $$G_{recon}^{lpf}$$

of a low pass filtered G block by using four neighboring pixel values.

The intra predicting unit 120 may provide not only conventional intra prediction modes, which are a planar mode, a vertical mode, a horizontal mode, and a DC mode, but also an LMchroma mode, which is an ECM suggested by J. Kim, and a low pass filter (LPF) LMchroma mode, which is a mode for applying an ECM after removing high frequency ingredients of a Luma (G) area by using a LPF based on a correlation between the Luma (G) area and the Chroma (B, R) areas even in the LMchroma mode according to the present invention. Furthermore, after block prediction is individually performed in each of the modes, an optimal mode is selected, and information regarding the selected optimal mode is transmitted together with pixel values regarding a block that are predicted in the optimal mode. Therefore, efficiency of predicting pixel values between color planes may be significantly improved.

Table 2 shows an example of flags according to an intra chroma prediction mode according to the present invention.

TABLE 2

| intra_chroma_pred_mode | chroma_pred_from_luma_enabled_flag = 1 | | chroma_pred_from_luma_enabled_flag = 0 | |
|---|---|---|---|---|
| | prefix | suffix | prefix | suffix |
| 6 (DM_CHROMA) | 0 | n/a | n/a | n/a |
| 5 (proposed method) | 10 | 1 | 0 | n/a |
| 4 (ECM) | 10 | 0 | 0 | n/a |
| 0 (PLANAR) | 11 | 00 | 1 | 00 |
| 1 (VERTICAL) | 11 | 01 | 1 | 01 |
| 2 (HORIZONTAL) | 11 | 10 | 1 | 10 |
| 3 (DC) | 11 | 11 | 1 | 11 |

As shown in Table 2, as an intra chroma prediction mode indicates an LMchroma mode and a LPF LMchroma mode prediction unit may be performed even in an LMchroma mode, a flag may be set up by adding a suffix 0 (when filtering is not applied) or a suffix 1 (when filtering is applied) based on whether a low pass filtering is performed in the LMchroma mode (prefix: 10) in case of binarization of intra prediction as shown in the second and third columns of Table 2. Although only the prefix '10' bit was used as a flag for encoding a mode in an ECM mode in the related art, in the present invention, both the prefix '10' bit and the suffix 1 bit are used to additionally use the LPF LMchroma mode, where the suffix 1 is used as a correlation flag. However, set locations and values of flags may vary.

FIG. 5 is a diagram showing an example of intra prediction methods for an encoding operation performed by the intra predicting unit of FIG. 3.

To describe the intra prediction method of FIG. 5 with reference to FIG. 3, the intra predicting unit 120 first analyzes a prediction mode set to the image encoding apparatus 100 (operation S110). Since the image encoding apparatus 100 may provide an inter prediction mode and an intra prediction mode as prediction modes as described above, the prediction mode of the image encoding apparatus 100 should be set to an intra prediction mode for activation of the intra predicting unit 120. Therefore, the intra predicting unit 120 first analyzes the setting of the image encoding apparatus 100. Next, it is determined as a result of the analysis whether a set prediction mode is the intra prediction mode (operation S120). If the set prediction mode is not an intra prediction mode (that is, the set prediction mode is an inter prediction mode), the inter prediction mode is performed. Since an inter prediction mode is not a task performed by the intra predicting unit 120, the intra predicting unit 120 does not perform any operation. However, if the set prediction mode is an intra prediction mode, the chroma predicting unit 121 of the intra predicting unit 120 performs block predictions by using all available prediction modes (operation S130). In FIG. 5, according to the configuration of the chroma predicting unit 121 of FIG. 3, each of five prediction units, which are the planar mode prediction unit PM, the vertical mode prediction unit VM, the horizontal mode prediction unit HM, the DC mode prediction unit DC mode, and the LMchroma mode prediction unit LMCM, generates prediction blocks in a pre-set corresponding mode. In particular, the correlation calculating unit COC of the LMchroma mode prediction unit LMCM calculates a correlation between the Luma (G) area and the Chroma (B, R) areas (operation S135). Next, it is determined whether the calculated correlation is smaller than a pre-set threshold value (operation S136). If the calculated correlation is smaller than the pre-set threshold value, a Luma (G) area block is transmitted to the low pass filter LPF, where the low pass filter LPF performs a low-pass filtering with regard to the Luma (G) area block (operation S137). Next, the low-pass filtered Luma (G) area block is transmitted to the extended chroma prediction unit ECM and prediction blocks regarding the Chroma (B, R) pixel are generated by using an ECM technique (operation S137). However, if the calculated correlation is equal to or greater than the pre-set threshold value, the Luma (G) area block is directly transmitted to the extended chroma prediction unit ECM, where the extended chroma prediction unit ECM generates prediction blocks including the Chroma (B, R) pixels by applying an ECM technique with regard to the Luma (G) area block that is not low-pass filtered.

Furthermore, the generated prediction blocks are transmitted to the rate-distortion optimizing unit 122, and the rate-distortion optimizing unit 122 analyzes pixel values of the prediction blocks and determine an optimal mode (operation S140). When the optimal mode is determined by the rate-distortion optimizing unit 122, the mode selecting unit 123 selects the determined optimal mode (operation S150). Next, a flag is set up according to pre-set rules based on the selected optimal mode (operation S160). When a flag is set up, the mode selecting unit 123 outputs the set up flag together with a selected prediction block (operation S170).

Figure 6:
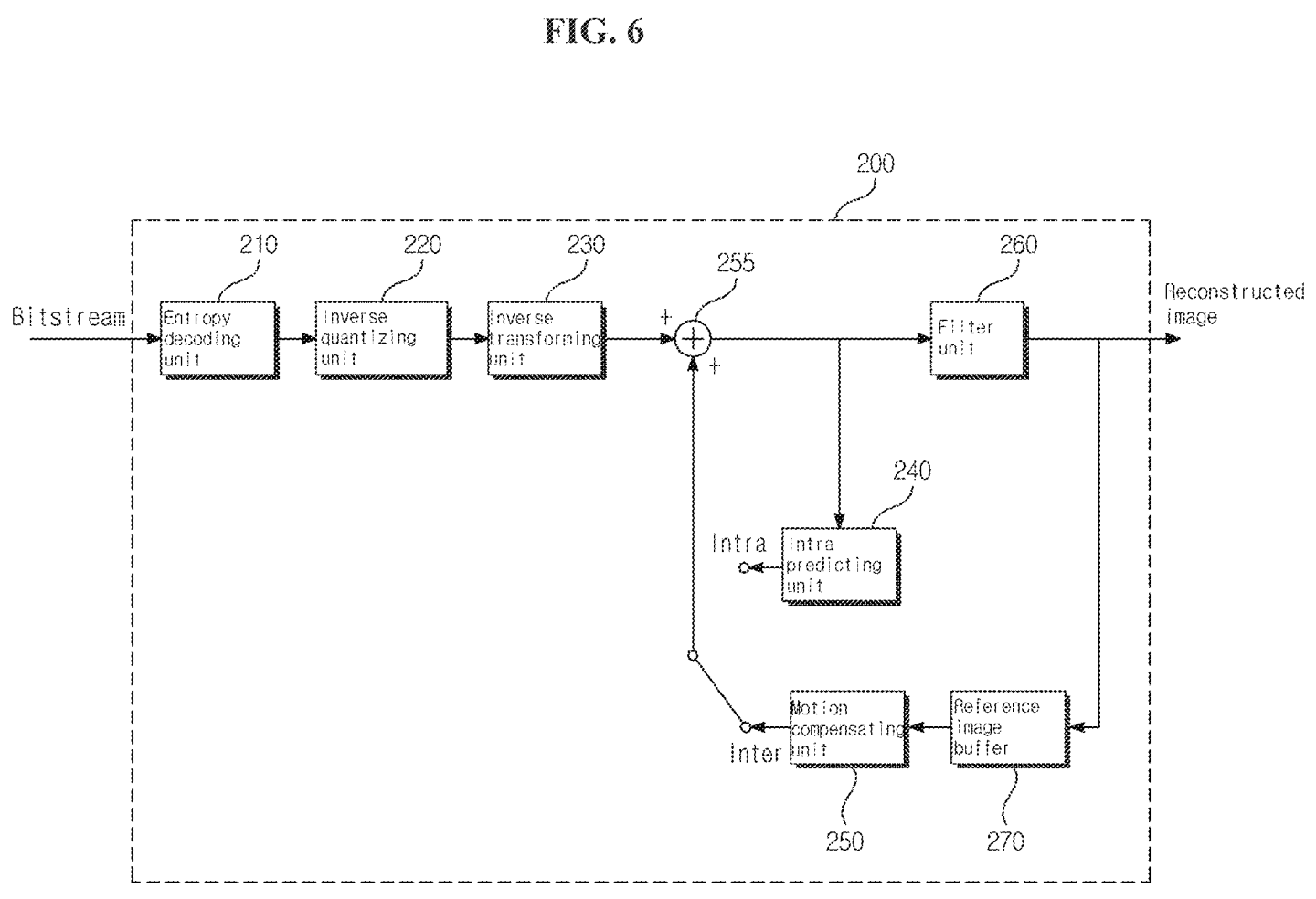

FIG. 6 is a schematic block diagram showing an example structure of an image decoding apparatus according to an embodiment of the present invention.

Referring to FIG. 6, an image decoding apparatus 200 includes an entropy decoding unit 210, an inverse quantizing unit 220, an inverse transforming unit 230, an intra predicting unit 240, a motion compensating unit 250, a filter unit 260, and a reference image buffer 270.

The image decoding apparatus 200 receives a bitstream output by an encoding apparatus, decodes the bitstream in an intra mode or an inter mode, and outputs a reconstructed image. In an intra mode, a prediction block is generated by using an in-screen prediction mode. In an inter mode, a prediction block is generated by using an inter-screen prediction mode. The image decoding apparatus 200 obtains a residual block from an input bitstream, generates a prediction block, and generates a block reconstructed by adding the residual block to the prediction block, that is, a reconstructed block.

The entropy decoding unit 210 decodes the input bitstream based on probability distribution and outputs a quantized coefficient. The quantized coefficient is inverse quantized by the inverse quantizing unit 220 and is inverse transformed by the inverse transforming unit 230. As a result of the inverse quantization and the inverse transformation of the quantized coefficient, a residual block is generated.

In an intra prediction mode, the intra predicting unit 240 generates a prediction block by performing a spatial prediction by using pixel values of blocks neighboring a current block. Here, in particular, the intra predicting unit 240 according to the present invention analyzes the flag of an input bitstream and, if the flag is set to the LMchroma mode, it is determined whether the correlation flag is set to the LPF LMchroma mode. If it is determined that the correlation flag is set to the LPF LMchroma mode, high frequency ingredients of the decoding-completed luma (G) area is removed by using a low pass filter (LPF) first. Next, an ECM technique for predicting chroma (B, R) pixels with reference to the Luma (G) pixel from which the high frequency ingredients are removed is applied.

In an inter prediction mode, the motion compensating unit 250 generates a prediction block by performing motion compensation by using a motion vector and a reference image stored in the reference image buffer 270.

The residual block and the prediction block are combined by the adder 255, and the combined block is processed by the filter unit 260. The filter unit 260 may apply at least one of a deblocking filter, a SAO, and an ALF to a restored block or a restored picture. The filter unit 260 outputs a reconstructed image. The reconstructed image is stored in the reference image buffer 270 and may be used for an inter prediction.

Figure 7:
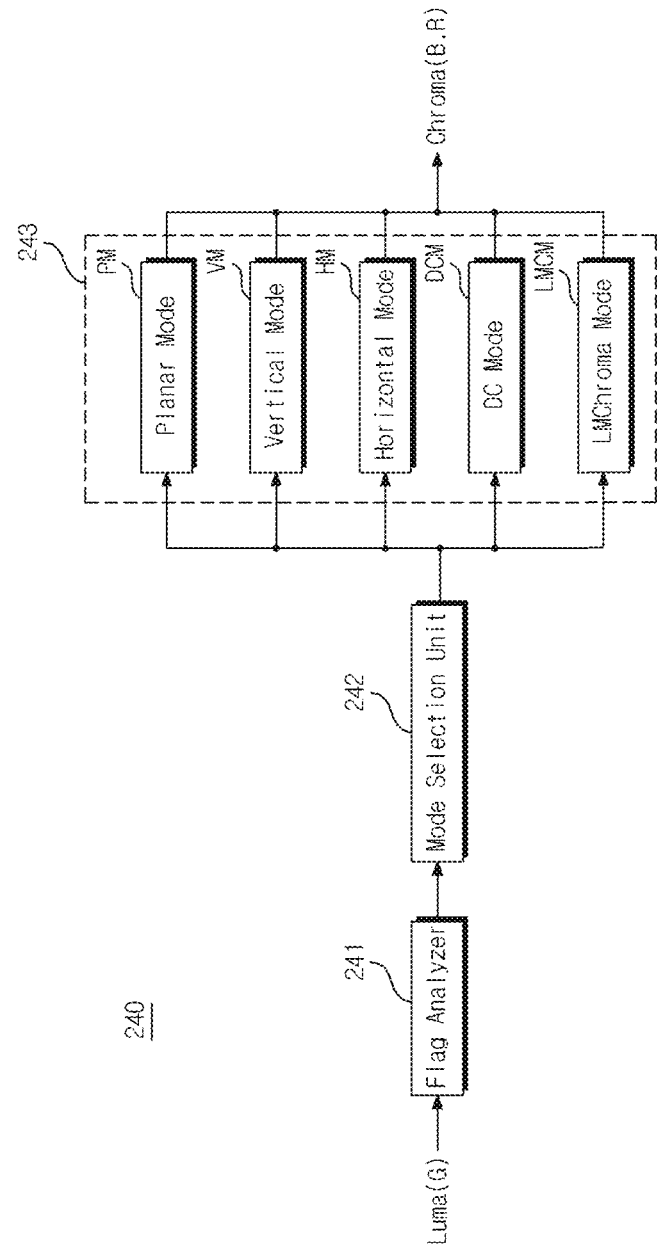
FIG. 7 is a diagram showing an example of the intra prediction unit of FIG. 6.

FIG. 7 is a diagram showing an example of detailed configurations of an intra prediction unit.

An intra predicting unit 240 of FIG. 7 includes a flag analyzing unit 241, a mode selecting unit 242, and a chroma predicting unit 243.

The flag analyzing unit 241 analyzes a flag included in a bitstream and transmits information regarding an analyzed mode to the mode selecting unit 242. The mode selecting unit 242 selects one of a planar mode prediction unit PM, a vertical mode prediction unit VM, a horizontal mode prediction unit HM, a DC mode prediction unit DC mode, and a LMchroma mode prediction unit LMCM included in the chroma predicting unit 243 based on the mode analyzed by the flag analyzing unit 241, activates the selected prediction unit, and transmits the received bitstream to the activated prediction unit.

The chroma predicting unit 243 includes the planar mode prediction unit PM, the vertical mode prediction unit VM, the horizontal mode prediction unit HM, the DC mode prediction unit DC mode, and the LMchroma mode prediction unit LMCM, each of which is activated according to a selection of the mode selecting unit 242 and generates a prediction block according to pre-set rules.

In particular, the LMchroma mode LMCM may predict the Chroma (B, R) pixel values with direct reference to the Luma (G) pixel values based on the correlation flag. Alternatively, the LMchroma mode LPFM may operate in the LPF LMchroma mode for removing high frequency ingredients of the decoded luma (G) area by using a low pass filter (LPF) and predicting Chroma (B, R) pixel values with reference to the Luma (G) pixel values from which the high frequency ingredients are removed.

Table 3 shows a result of analyzing performance of a LPF LM chroma mode according to the present invention by applying the LPF LM chroma mode to first frames of the eight RGB experimental images of Table 1. Table 3 was obtained by using the HM10.0_RExt2.0 program, where the HEVC range extension common test conditions (D. Flynn, K. Sharman, "Common test conditions and software reference configurations for HEVC range extensions", JCTVC-L1006, 12th Meeting, Geneva, Switzerland, January 2013.)

were applied for setting experiment variables. Furthermore, performance of the suggested algorithm technique has been tested in All-Intra (AI) mode by using 8 RGB 4:4:4 test images, where a LPF used in the test was 2D-separatble LPF (ho=[1 2 1]/4). As shown in Table 3, compared to the conventional LM chroma mode, when an intra chroma prediction mode according to the present invention was performed, average bitrate-gains of 0.4%, 0.6%, and 0.8% could be obtained at respective color planes G, B, and R at the All Intra HE Super-High-tier compared to the ECM, which is the conventional LM chroma mode. Therefore, an overall average bitrate-gain of 0.6% could be obtained. Furthermore, encoding speed was increased by about 8%, whereas decoding speed was increased by 1%. In particular, since the decoding speed (complexity), which is most sensitive to speed increase, an average bitrate-gain of 0.6% could be obtained without increasing encoding and decoding speeds according to the technique according to the present invention. Therefore, the technique according to the present invention may be considered as an efficient technique.

TABLE 3

| | All Intra HE Super-High-tier | | |
| --- | --- | --- | --- |
| | G | B | R |
| Traffic | 0.0% | −0.2% | −0.6% |
| Kimono1 | −0.6% | −0.9% | −0.9% |
| EBULupoCandlelight | −0.5% | −0.7% | −0.9% |
| EBURainFruits | 0.6% | 0.0% | −0.5% |
| VenueVu | −0.8% | −1.3% | −1.2% |
| DucksAndLegs | −0.5% | −0.3% | −0.1% |
| OldTownCross | −0.6% | −0.8% | −0.8% |
| ParkScene | −0.7% | −0.9% | −0.9% |
| Overall | −0.4% | −0.6% | −0.8% |
| Enc Time[%] | | 108% | |
| Dec Time[%] | | 101% | |

Figure 8:
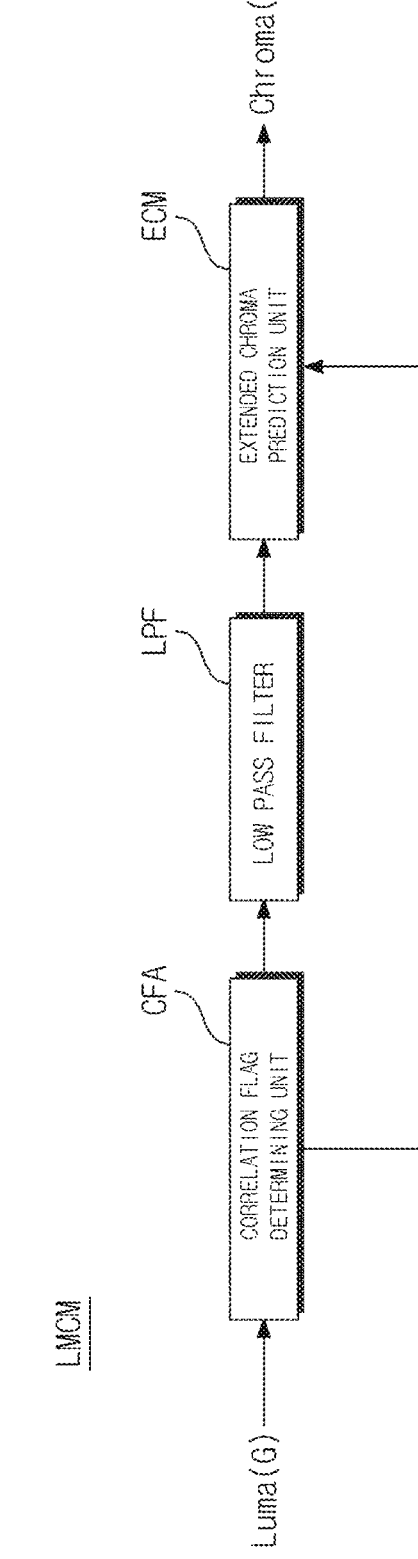
FIG. 8 shows a detailed configuration of the LMchroma mode prediction unit of FIG. 7.

FIG. 8 shows a detailed configuration of the LM chroma mode prediction unit LMCM of FIG. 7.

In FIG. 8, the LM chroma mode prediction unit LMCM includes a correlation flag determining unit CFA, a low pass filter LPF, and an extended chroma prediction unit ECM. The correlation flag determining unit CFA receives an encoded block including Luma (G) pixels and determines whether a correlation flag is set to a flag analyzed by the flag analyzing unit 241. If no correlation flag is set, the Luma (G) pixels are directly transmitted to the extended chroma prediction unit ECM. If a correlation flag is set, the Luma (G) pixels are transmitted to the low pass filter LPF.

The low pass filter LPF receives the Luma (G) area block, removes high frequency ingredients of the Luma (G) area block, and transmits the low-pass filtered pixel values to the extended chroma prediction unit ECM.

The extended chroma prediction unit ECM predicts the Chroma (B, R) pixel values by applying the Luma (G) pixel values transmitted from the correlation flag determining unit CFA or the low pass filter LPF to Equation 1.

Therefore, the LMchroma mode prediction unit LMCM off FIG. 8 may operate in the same regard as a LMchroma mode in the related art based on a set value of the correlation flag. Alternatively, high frequency ingredients may be removed from the Luma (G) area by applying the low pass filter LPF and pixel values may be predicted by performing an LMchroma mode.

Although it is described above that the correlation flag determining unit CFA is included in the LMchroma mode prediction unit LMCM for convenience of explanation, the correlation flag determining unit CFA may be included in the flag analyzing unit 241. If the correlation flag determining unit CFA is included in the flag analyzing unit 241, the mode selecting unit 242 may transmit a Luma (G) area block to either the low pass filter LPF or the extended chroma prediction unit ECM in the LMchroma mode prediction unit LMCM based on a correlation flag analyzed by the flag analyzing unit 241.

Figure 9:
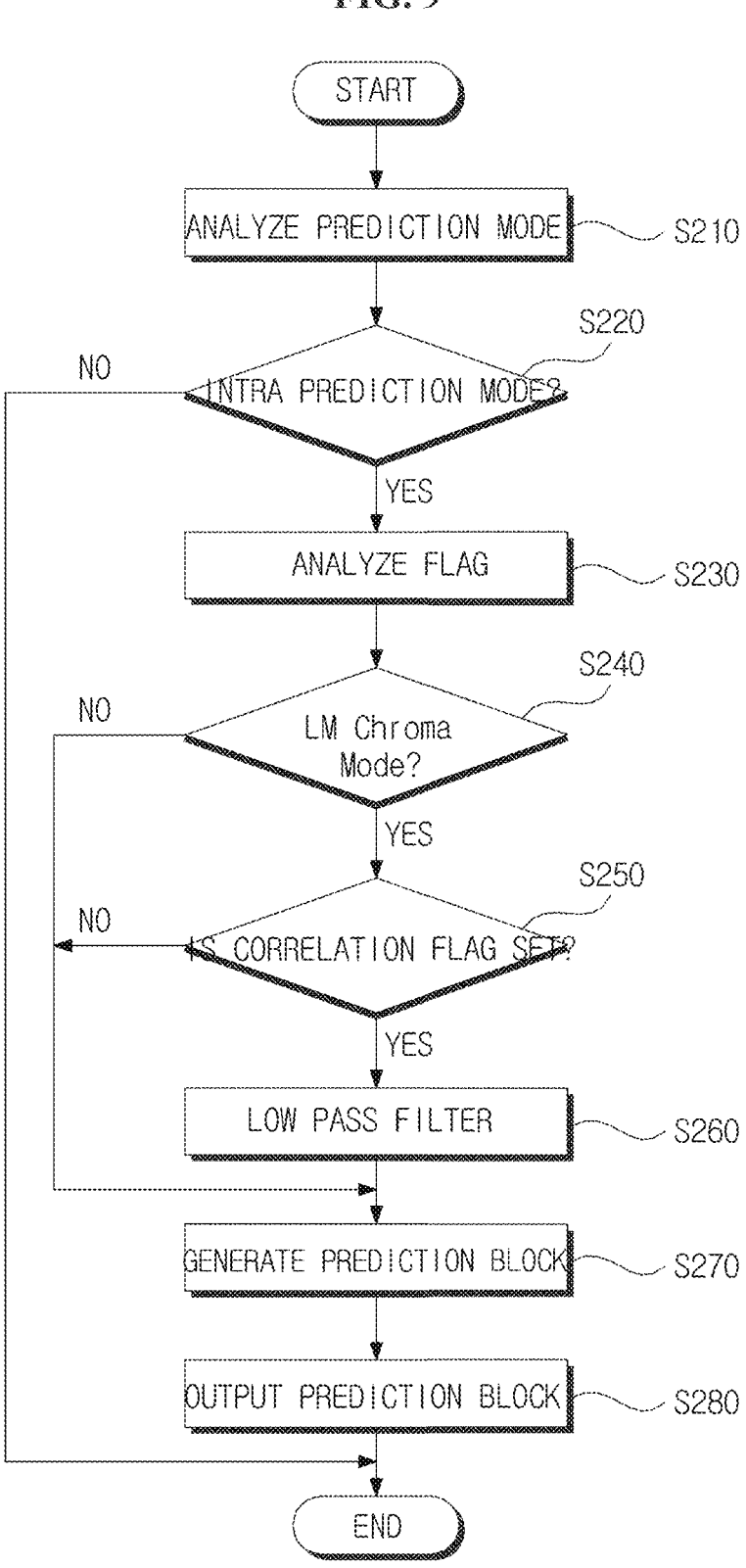
FIG. 9 is a diagram showing an example of in-screen prediction methods for a decoding operation performed by the intra predicting unit of FIG. 7.

FIG. 9 is a diagram showing an example of intra prediction methods for a decoding operation performed by the intra predicting unit of FIG. 6.

To describe the intra prediction method of FIG. 9 with reference to FIG. 7, the intra predicting unit 240 first analyzes a prediction mode set to the image decoding apparatus 200 (operation S210). Next, it is determined whether the analyzed prediction mode is the intra prediction mode (operation S220). If the set prediction mode is not an intra prediction mode, the set prediction mode is an inter prediction mode, and thus the intra predicting unit 240 is not activated and the method is terminated. However, if the set prediction mode is an intra prediction mode, a bitstream is received, and the flag of the received bitstream is analyzed (operation S230). It is determined through the analysis of the flag whether the flag set to the bitstream indicates a LM chroma mode (operation S240). If the set flag does not indicate the LM chroma mode, a prediction block is generated in a mode corresponding to the set flag (operation S270). However, if the set flag is the LM chroma mode, it is determined whether a correlation flag is set thereto (operation S250). If it is determined that a correlation flag is set, a low pass filtering is performed with respect to a luma (G) area (operation S260). Next, prediction blocks regarding chroma (B, R) areas are generated by using the color plane of the low pass filtered luma (G) area (operation S270). However, if no correlation flag is set, low-pass filtering is not performed, and prediction blocks including Chroma (B, R) pixels are generated by using the color plane of the Luma (G) area (operation S270). Next, the generated prediction blocks are output (operation S280).

As described above, according to methods, apparatuses, and systems for encoding and decoding an image according to the present invention, in an ECM for predicting Chroma (B, R) pixel with reference to a Luma (G) pixel during an intra prediction, an LM Chroma mode may apply an ECM technique after a low-pass filtering is selectively applied based on a correlation between color planes, thereby improving coding efficiency.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An image decoding apparatus, comprising:
an entropy-decoder configured to decode information including first information and second information,
wherein the first information indicates whether to use one of a plurality of Linear Model (LM) chroma prediction modes representing that a chroma prediction pixel in a chroma block of a current block is derived by a luma value,
wherein the second information specifies the one of the plurality of LM chroma prediction modes for the current block,
wherein the information is signaled at a block level; and
an intra predictor configured to:
obtain the luma value using a luma pixel corresponding to the chroma prediction pixel, the luma pixel being in a luma block of the current block; and
generate the chroma prediction pixel using the luma value multiplied by a first weight,
wherein, in response to the first information indicating that the one of the plurality of LM chroma prediction modes is used, the one of the plurality of LM chroma prediction modes is specified based on the second information,
wherein the plurality of LM chroma prediction modes comprises a first LM chroma prediction mode and a second LM chroma prediction mode,
wherein, under the first LM chroma prediction mode, the first weight is obtained by using a filtered luma pixel, the filtered luma pixel being obtained by using luma pixels located to a left of the luma block,
wherein, under the second LM chroma prediction mode, the first weight is obtained without using the filtered luma pixel,
wherein the luma value is obtained by further using four neighboring luma pixels adjacent to the luma pixel corresponding to the chroma prediction pixel,
wherein the luma value is obtained by a weighted sum of the luma pixel and the four neighboring luma pixels, and
wherein a ratio between a first coefficient multiplied with the luma pixel and a second coefficient multiplied with the four neighboring luma pixels is 4:1, and
an adder configured to add a residual block of the current block to a prediction block of the current block obtained based on the chroma prediction pixel.

2. The apparatus for decoding the image of claim 1, wherein both of the first LM chroma prediction mode and the second LM chroma prediction mode are selectable for the current block regardless of color format of a current picture including the current block.

3. The apparatus for decoding the image of claim 1, wherein the chroma prediction pixel is calculated by a formula as follows:

$$C_{pred}[x.y] = \alpha * L_{recon} + \beta$$

([x,y] is a location of the chroma prediction pixel, $\alpha$ is the first weight, $\beta$ is a second weight, $L_{recon}$ is the luma value, and $C_{pred}$ is the chroma prediction pixel).

4. An image encoding apparatus, comprising:
an intra predictor configured to:
obtain a luma value using a luma pixel corresponding to a chroma prediction pixel in a chroma block of a current block, the luma pixel being in a luma block of the current block; and generate the chroma prediction pixel using the luma value multiplied by a first weight, a subtractor configured to generate a residual block based on a difference between an input block of the current block and a prediction block of the current block obtained based on the chroma prediction pixel, and an entropy-encoder configured to encode information including first information and second information, wherein the first information indicates whether to use one of a plurality of Linear Model (LM) chroma prediction modes representing that the chroma prediction pixel is derived by the luma value, wherein the second information specifies the one of the plurality of LM chroma prediction modes for the current block, wherein the information is encoded at a block level, wherein, in response to the first information indicating that the one of the plurality of LM chroma prediction modes is used, the second information specifying the one of the plurality of LM chroma prediction modes is encoded into a bitstream, wherein the plurality of LM chroma prediction modes comprises a first LM chroma prediction mode and a second LM chroma prediction mode, wherein, under the first LM chroma prediction mode, the first weight is obtained by using a filtered luma pixel, the filtered luma pixel being obtained by using luma pixels located to a left of the luma block, wherein, under the second LM chroma prediction mode, the first weight is obtained without using the filtered luma pixel, wherein the luma value is obtained by further using four neighboring luma pixels adjacent to the luma pixel corresponding to the chroma prediction pixel, wherein the luma value is obtained by a weighted sum of the luma pixel and the four neighboring luma pixels, and wherein a ratio between a first coefficient multiplied with the luma pixel and a second coefficient multiplied with the four neighboring luma pixels is 4:1.

5. The apparatus for encoding the image of claim 4, wherein both of the first LM chroma prediction mode and the second LM chroma prediction mode are selectable for the current block regardless of color format of a current picture including the current block.

6. The apparatus for encoding the image of claim 4, wherein the chroma prediction pixel is calculated by a formula as follows:

$$C_{pred}[x.y] = \alpha * L_{recon} + \beta$$

([x,y] is a location of the chroma prediction pixel, $\alpha$ is the first weight, $\beta$ is a second weight, $L_{recon}$ is the luma value, and Spread is the chroma prediction pixel).

7. A method of transmitting a bitstream comprising:

obtaining a luma value using a luma pixel corresponding to a chroma prediction pixel in a chroma block of a current block, the luma pixel being in a luma block of the current block;

generating the chroma prediction pixel using the luma value multiplied by a first weight;

generating a residual block based on a difference between an input block of the current block and a prediction block of the current block obtained based on the chroma prediction pixel;

encoding information including first information and second information into the bitstream; and, transmitting the bitstream, wherein the first information indicates whether to use one of a plurality of Linear Model (LM) chroma prediction modes representing that the chroma prediction pixel is derived by the luma value, wherein the second information specifies the one of the plurality of LM chroma prediction modes for the current block, wherein the information is encoded at a block level, wherein, in response to the first information indicating that the one of the plurality of LM chroma prediction modes is used, the second information specifying the one of the plurality of LM chroma prediction modes is encoded into the bitstream, wherein the plurality of LM chroma prediction modes comprises a first LM chroma prediction mode and a second LM chroma prediction mode, wherein, under the first LM chroma prediction mode, the first weight is obtained by using a filtered luma pixel, the filtered luma pixel being obtained by using luma pixels located to a left of the luma block, wherein, under the second LM chroma prediction mode, the first weight is obtained without using the filtered luma pixel, wherein the luma value is obtained by further using four neighboring luma pixels adjacent to the luma pixel corresponding to the chroma prediction pixel, wherein the luma value is obtained by a weighted sum of the luma pixel and the four neighboring luma pixels, and wherein a ratio between a first coefficient multiplied with the luma pixel and a second coefficient multiplied with the four neighboring luma pixels is 4:1.

* * * * *